United States Patent
Prizzi et al.

(10) Patent No.: US 8,230,664 B2
(45) Date of Patent: Jul. 31, 2012

(54) POUCH OPENING FEATURE AND METHOD FOR MAKING THE SAME

(75) Inventors: John Prizzi, Southbury, CT (US); Barry R. Reese, Hartsville, SC (US); Lea Wayne, Downers Grove, IL (US)

(73) Assignee: Sonoco Development, Inc., Florence, SC (US)

( * ) Notice: Subject to any disclaimer, the term of this patent is extended or adjusted under 35 U.S.C. 154(b) by 1024 days.

(21) Appl. No.: 12/180,709

(22) Filed: Jul. 28, 2008

(65) Prior Publication Data
US 2010/0021672 A1    Jan. 28, 2010

(51) Int. Cl.
*B65B 61/20* (2006.01)
(52) U.S. Cl. .......... 53/133.3; 493/212; 493/223
(58) Field of Classification Search .......... 53/133.3, 53/133.6, 133.8; 493/212, 223
See application file for complete search history.

(56) References Cited

U.S. PATENT DOCUMENTS

| | | |
|---|---|---|
| 3,608,815 A | 9/1971 | Bunch |
| RE27,913 E | 2/1974 | Hutcheson |
| 4,332,327 A | 6/1982 | Frohwerk et al. |
| 5,158,499 A | 10/1992 | Guckenberger |
| 5,222,813 A | 6/1993 | Kopp et al. |
| 5,229,180 A | 7/1993 | Littmann |
| 5,409,115 A | 4/1995 | Barkhorn |
| 5,411,202 A | 5/1995 | Fenini |
| 5,511,664 A | 4/1996 | Aramaki et al. |
| 5,620,095 A | 4/1997 | Delmore et al. |
| 5,630,308 A | 5/1997 | Guckenberger |
| 5,688,418 A | 11/1997 | Yoshiyasu et al. |
| 5,897,052 A | 4/1999 | Tanaka et al. |
| 5,910,261 A | 6/1999 | Mori et al. |
| 5,984,088 A | 11/1999 | Dietz et al. |
| 5,988,489 A | 11/1999 | Moteki et al. |
| 6,030,122 A | 2/2000 | Ramsey et al. |
| 6,074,097 A | 6/2000 | Hayashi et al. |
| 6,102,571 A | 8/2000 | Moteki et al. |

(Continued)

FOREIGN PATENT DOCUMENTS
EP          473517        *  3/1992
(Continued)

OTHER PUBLICATIONS
Office Action for Canadian Application No. 2,655,876 dated Mar. 30, 2011.

*Primary Examiner* — Hemant M Desai
(74) *Attorney, Agent, or Firm* — Alston & Bird LLP

(57) ABSTRACT

A flexible packaging structure has built-in opening features in a laminate with a first structure adhesively joined to a second structure. A tear area is formed by laser ablation of the laminate along a junction between the first and second portions preferably prior to assembling the laminate into the package. Laser ablation begins at the center of the tear area and progressively moves the laser in a direction radially outward from the center of the tear area. During assembly of the package, a seal is formed between end portions of the first and second portions of the laminate. A score line and a sealant reduction area are also introduced to the package to facilitate opening. The package is opened by pulling the seal near the tear area in a direction along the score line until the contents of the package are accessible.

6 Claims, 2 Drawing Sheets

U.S. PATENT DOCUMENTS

| | | | |
|---|---|---|---|
| 6,293,073 B1 * | 9/2001 | Caudle | 53/133.1 |
| 6,343,876 B2 | 2/2002 | Takahashi et al. | |
| 6,352,364 B1 | 3/2002 | Möbs | |
| 6,427,420 B1 * | 8/2002 | Olivieri et al. | 53/412 |
| 6,726,363 B1 | 4/2004 | Marbler et al. | |
| 6,749,285 B2 | 6/2004 | Liu et al. | |
| 6,781,092 B2 | 8/2004 | De Steur et al. | |
| 6,860,843 B2 * | 3/2005 | Hayashi et al. | 493/56 |
| 6,910,995 B2 | 6/2005 | Schneider et al. | |
| 6,991,695 B2 | 1/2006 | Tait et al. | |
| 7,111,986 B2 | 9/2006 | Marbler et al. | |
| 7,207,719 B2 | 4/2007 | Marbler et al. | |
| 7,259,354 B2 | 8/2007 | Pailthorp et al. | |
| 7,261,468 B2 | 8/2007 | Schneider et al. | |
| 7,470,062 B2 | 12/2008 | Moteki et al. | |
| 2002/0068668 A1 * | 6/2002 | Chow et al. | 493/62 |
| 2003/0051440 A1 | 3/2003 | Chow et al. | |
| 2003/0188988 A1 | 10/2003 | De Caluwe | |
| 2004/0182831 A1 | 9/2004 | Cheng et al. | |
| 2004/0183855 A1 | 9/2004 | Cheng et al. | |
| 2004/0190800 A1 | 9/2004 | Peron et al. | |
| 2005/0084636 A1 | 4/2005 | Papenfuss et al. | |
| 2006/0126975 A1 | 6/2006 | McKellar | |
| 2007/0237434 A1 | 10/2007 | Mckellar | |
| 2008/0267541 A1 | 10/2008 | Daelmans et al. | |
| 2008/0273821 A1 * | 11/2008 | Doll | 383/209 |

FOREIGN PATENT DOCUMENTS

| | | |
|---|---|---|
| EP | 0 521 618 A2 | 1/1993 |
| JP | 402242746 A | 9/1990 |
| JP | 5-124679 A | 5/1993 |

* cited by examiner

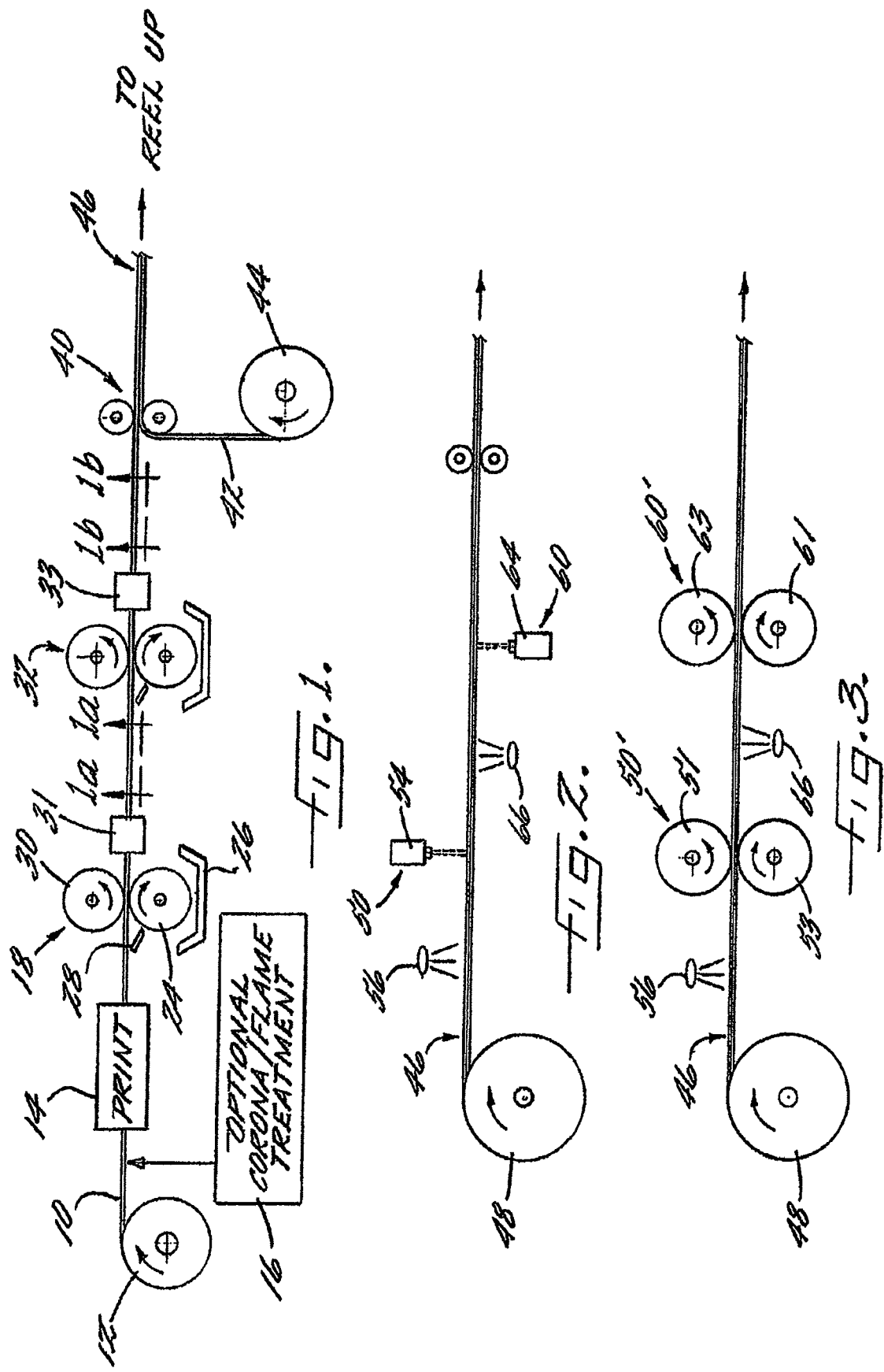

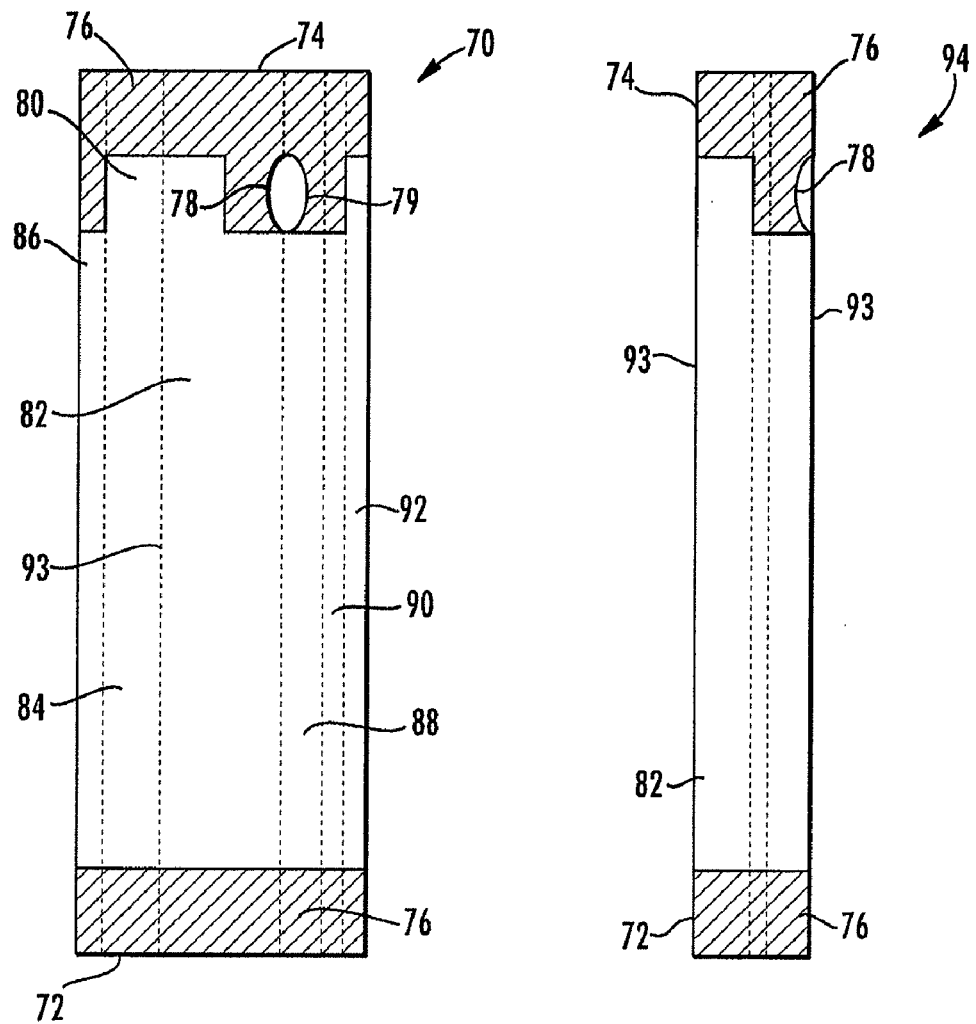
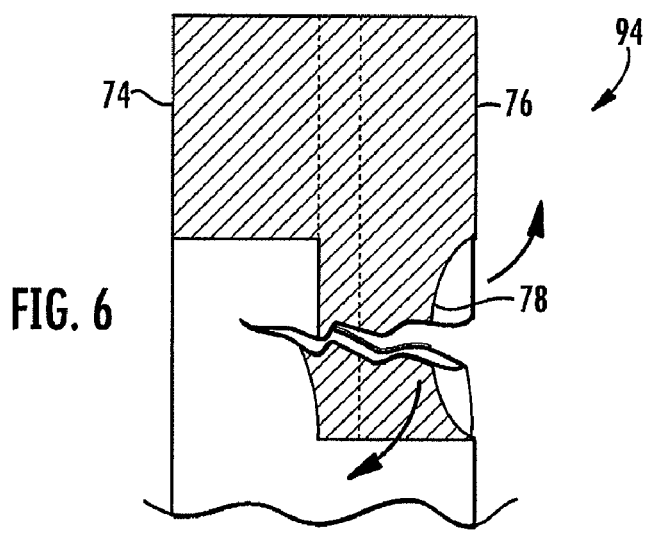

POUCH OPENING FEATURE AND METHOD FOR MAKING THE SAME

BACKGROUND OF THE INVENTION

This disclosure relates to food or beverage containers in the form of a sealed pouch or the like formed from flexible laminate material. The laminate typically includes at least a barrier layer and a sealant layer. Edges of the laminate material are sealed together via the sealant layer to create the pouch or other configuration.

A variety of food and non-food products are packaged using flexible packaging materials formed primarily of laminations of one or more of polymer films, metallized polymer films, paper, metal foil, and the like. In many instances, it is desirable to provide easy access to the contents of the package such that a user can provide minimal effort to open the package without the risk of injury. Packages that are easily opened, however, typically suffer from being poorly sealed resulting in the contents of the package being adversely affected (e.g., becoming soggy, drying out, etc.) by exposure to the surrounding environment.

Easy opening of such flexible packaging has been a long-standing problem to which much effort has been devoted toward developing a satisfactory solution by many workers in the field. Mechanical or laser ablation to form a notch or line of weakening in the laminate material, at which tearing of the material can be initiated, has been the typical approach. In the case of laser-formed opening features, a past approach has been to ablate partway through the thickness of the laminate to weaken it while attempting to not compromise the barrier function of the laminate. These techniques have not met with complete success in all cases, particularly when the unablated portions of the laminate are a highly extensible material, because the extensible layers may not tear easily. Instead, the highly extensible materials typically stretch, and thus, result in opening failures of the package.

Further, mechanical processes to form a notch or line of weakening in the laminate material add complexity and scrap to the manufacturing process. The equipment involved with mechanical processes, such as die-cutting equipment, typically involves numerous moving parts. Manufacturing processes involving moving parts typically malfunction more frequently and become misaligned, and thus, additional maintenance of the manufacturing process is required to repair and/or align the moving parts. Mechanical processes also can create scrap that may interfere with the manufacturing process or may need to be removed by a separate process, adding cost and complexity to the overall manufacturing process.

Accordingly, there is a need for an improved manufacturing process to produce opening features for sealed pouches formed from flexible laminate that securely seals the contents of a package during the packing process but allows the package to be easily opened by the consumer.

BRIEF SUMMARY OF THE DISCLOSURE

The present disclosure addresses the above needs and achieves other advantages, by providing a flexible packaging structure and method for making same, in which the structure has opening features built into the structure. In accordance with one embodiment of the invention a laminate with a first structure is joined in face-to-face relation to a second structure through the use of an adhesive. After assembly of the packaging structure a seal area is formed that includes an end of a front portion and an end of a rear portion of the laminate, the rear portion of the laminate being adjacent to the front portion when the laminate is in a flat or unassembled state. The seal areas include a first tear area along the front portion of the laminate and a second tear area along the rear portion of the laminate. Both the first and second tear areas are formed prior to forming the seal and preferably when the laminate is in the flat or unassembled state.

In some embodiments, the first and second tear areas may have a laminate thickness that is different, and preferably less than, the thickness of the laminate adjacent to the tear areas. The flexible packaging structure may optionally have first and second tears areas that are completely free from any laminate material. To create the tear area any number of mechanical, electrical, thermal, or chemical means may be used. Ideally, the first and second tear areas are formed using laser ablation.

The tear areas of the laminate may be positioned along a junction between the front and rear portions of the laminate, and such tear areas may take the shape of substantially parabolic segments with respect to the junction. A fold may then be introduced along the junction such that the tear areas partially or fully overlap. The fold will also act to bring the sealant film of the front and rear portions together to form a seal in the flexible package. Prior to forming a seal, however, portions of the sealant film may be removed from a sealant reduction area to facilitate opening the completed package. Additionally, a score line may be formed in the seal area of the laminate. Such a score line is preferably oriented in a tearing direction and adjacent the first tear area.

In accordance with another embodiment, the flexible packaging structure has built-in opening features and is constructed from a laminate with a first structure joined to a second structure in a face-to-face relationship via a sealant layer of the laminate. The opening feature is formed in the laminate and includes a substantially circular tear area. Laser ablation may be used to form the tear area such that some or all of the laminate is removed along a junction between the first and second portions of the laminate. A center of the tear area can be offset in a perpendicular direction from a line formed by the junction between the first and second portions. The tear area may be formed prior to assembling the laminate into the flexible packaging structure. During assembly of the flexible packaging structure a fold may be introduced along the junction of the laminate, and thus, forming a groove at the tear area.

A seal is formed between end portions of the first and second portions with a sealant film, and a score line is formed along the seal adjacent to the tear area. A sealant reduction area of the first portion may be formed prior to forming the seal by having a portion of the surface sealant film removed prior to assembly of the flexible packaging structure. The flexible packaging structure is opened by pulling the seal near the junction and the tear area in a direction generally parallel to the score line until the contents of the flexible packaging structure are accessible.

The process of producing the package in accordance with the present disclosure comprises adhesively joining the first structure to a second structure so as to form a laminate. A sealant film can then be a layer of the laminate. The tear area of the flexible packaging structure is formed by using laser ablation to penetrate through a least a portion of a thickness of the laminate material. More specifically, laser ablation of the tear area of the laminate begins at a center of the tear area and progressively moves the laser in a direction radially outwardly from the center until the laser creates a substantially circular perimeter of the tear area.

The process may involving the formation of other opening features such as forming a score line adjacent the tear area and substantially perpendicular to the junction between the first and second structures. Further, a sealant reduction area can be formed by removing a portion of the sealant film of the laminate.

BRIEF DESCRIPTION OF THE SEVERAL VIEWS OF THE DRAWINGS

Having thus described the disclosure in general terms, reference will now be made to the accompanying drawings, which are not necessarily drawn to scale, and wherein:

FIG. 1 is a diagrammatic depiction of a first phase of a manufacturing method for making a flexible packaging structure in accordance with one embodiment of the invention;

FIG. 2 is a diagrammatic depiction of a second phase of the method in accordance with one embodiment of the invention;

FIG. 3 is a diagrammatic depiction of a second phase of the method in accordance with another embodiment of the invention;

FIG. 4 is a plan view of the laminate used to form a flexible packaging structure in accordance with one embodiment of the invention FIG. 5 is a front view of a package that can be formed from a flexible packaging structure made in accordance with the embodiment FIG. 4;

FIG. 6 shows an enlarged portion of the tear area of the package in FIG. 5 in a partially opened state.

DETAILED DESCRIPTION OF THE DRAWINGS

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As an initial overview of preferred embodiments of the invention, a flexible packaging laminate is constructed to have a built-in opening feature. The laminate is constructed as a multi-layer structure by adhesively laminating a first structure to a second structure, wherein each of the first and second structures comprise one or more layers of flexible material. Adhesive may be applied to one of the structures before lamination. Once the laminate is formed, laser ablation operations are performed along portions of the laminate using a laser to penetrate through at least a portion of a thickness of the laminate material. Laser ablation of the tear areas of the laminate preferably begins at the center of a tear area, and progressively the laser moves in a direction radially outwardly from the center until the laser delineates, for example, a substantially circular perimeter of the tear area. The laser ablation process may also be used to form a score line adjacent the tear area and substantially perpendicular to a junction between two portions of the laminate. Further, laser ablation may also be used to form a sealant reduction area along the second structure of the laminate by, for example, ablating an area of the second structure of the laminate. The second structure of the laminate may be a sealant film.

More particularly, with reference to FIG. 1, a first phase of the manufacturing process is depicted. A first structure 10 is advanced from a supply roll 12 by suitable web driving and handling equipment (not shown) to an optional print station 14 comprising a printing apparatus, such as a rotogravure printer or the like, for printing graphics and/or indicia on the first structure by applying inks to a surface of the first structure. The first structure 10 comprises one or more layers of flexible packaging material. Various materials can be used for the layer(s) of the first structure, including polymers such polyesters, polyolefins (including homopolymers and copolymers), polyamides, and others; paper; metal foil; and the like. The first structure 10 may include an outer layer (not illustrated) that is substantially transparent and is reverse-printed in the print station 14, i.e., the inks are applied to the surface of the first structure 10 that is subsequently laminated to another structure, as described below, from the opposite side of the first structure, which will form an exterior of a package constructed from the packaging laminate, such that the inks are visible through the first structure. As an example, the first structure 10 can comprise a layer of polyester such as polyethylene terephthalate or the like.

Prior to printing the first structure in the print station, the surface of the first structure that is subsequently laminated to the other structure can be treated by a corona discharge or flame treatment apparatus 16 to render the surface more receptive to the inks and/or to render the surface more readily bondable to the adhesive that is subsequently applied to the surface as described below. Alternatively, the first structure 10 can have already been so treated prior to being wound into the supply roll 12, such that the treatment apparatus 16 is unnecessary.

Following the optional corona/flame treatment and/or optional printing operation, and with reference to FIG. 1, the first structure 10 is advanced to an optional first adhesive application station 18 at which, for example, a pressure-sensitive adhesive (not illustrated) is applied to the first structure.

The pressure-sensitive adhesive can comprise various compositions. Pressure-sensitive adhesives form viscoelastic bonds that are aggressively and permanently tacky, adhere without the need of more than a finger or hand pressure, and require no activation by water, solvent or heat. Pressure-sensitive adhesives are often based on non-crosslinked rubber adhesives in a latex emulsion or solvent-borne form, or can comprise acrylic and methacrylate adhesives, styrene copolymers (SIS/SBS), and silicones. Acrylic adhesives are known for excellent environmental resistance and fast-setting time when compared with other resin systems. Acrylic pressure-sensitive adhesives often use an acrylate system. Natural rubber, synthetic rubber or elastomer sealants and adhesives can be based on a variety of systems such as silicone, polyurethane, chloroprene, butyl, polybutadiene, isoprene, or neoprene. When the packaging laminate of the invention is to be used for food packaging, the pressure-sensitive adhesive generally must be a food-grade composition. Various pressure-sensitive adhesives are approved by the U.S. Food and Drug Administration for use in direct food contact, as regulated by 21 CFR Part 175.300. A preferred food-grade pressure-sensitive adhesive for use in the present invention is Jonbond 743 available from Bostik Findley. Additives (e.g., particulates or the like) can be added to the pressure-sensitive adhesive to reduce the tenacity of the bond to the underlying second structure 42, if necessary, so that the pressure-sensitive adhesive readily detaches from the second structure on opening (particularly on the very first opening).

The optional adhesive application station 18 can comprise any suitable device capable of accurately applying the pressure-sensitive adhesive to the first structure. For example, as shown, the adhesive application station can comprise a roll 24 that picks up the pressure-sensitive adhesive from a reservoir 26 on the outer surface of the roll. A doctor blade 28 may be used to scrape off any excess adhesive. The first structure 10 is contacted by the roll 24; a backing roll 30 provides support on the opposite side of the first structure 10. After the optional first adhesive application station 18, the first structure 10 is advanced to a dryer 31 such as an oven or the like, to dry any pressure-sensitive adhesive applied to the first structure.

The first structure 10 is then advanced to a second adhesive application station 32 at which a permanent laminating adhesive (not illustrated) may be applied to the first structure 10 as an alternative to the application of a pressure-sensitive adhesive. The permanent laminating adhesive is applied in such a manner that a sufficiently large proportion of the surface is covered by the permanent adhesive 34 to permit the first structure 10 to be adhesively attached to a second structure 42 at a downstream laminating station 40. A suitable adhesive application device 32, as shown, for the permanent adhesive can be a roll 24 as previously described. The permanent adhesive 34 can comprise various compositions. Suitable examples include two-component polyurethane adhesive systems, such as Tycel 7900/7283 available from Henkel. After the application of the permanent adhesive 34, the first structure 10 is advanced to a dryer 33 such as an oven or the like.

The first structure 10 is then advanced to a laminating station 40, comprising a pair of rolls forming a nip therebetween. The first structure 10 is passed through the nip along with a second structure 42 that is advanced from its own supply roll 44, and the first and second structures 10, 42 are laminated to each other. The second structure 42 comprises one or more layers of flexible material, and is coextensive with the first structure 10—i.e., the width of the second structure 42 is substantially equal to the width of the first structure 10 and the longitudinal edges of the second structure 42 substantially coincide with the longitudinal edges of the first structure 10.

The laminate may also optionally include a metallization layer or a metal foil layer between the first structure 10 and the second structure 42. This is beneficial in enhancing the barrier performance of the laminate as already noted. Additionally, however, the metallization layer or 85 metal foil layer can also be helpful when a laser is used for ablating only the first structure 10 or the second structure 42. For example, it can be difficult to employ a sufficiently high laser energy to ablate through a polyethylene sealant layer without ablating through the laminate more deeply than desired. Thus, the metallization layer or metal foil layer can be helpful in "tuning" the laser to penetrate only up to the metallization layer or foil layer.

The resulting laminate 46 is then advanced to a reel-up (not shown) where it is wound into a roll for subsequent processing in the second phase of the manufacturing process as described below. Alternatively, it is possible for the reel-up operation to be omitted, such that the laminate is directly advanced to the second phase.

With reference to FIG. 2, the second phase of the process is now described. A supply roll 48 of the laminate 46 formed in the first phase of the process is shown. The laminate is advanced from the supply roll to a first laser ablation station 50 at which an ablated area is formed through the thickness of the first structure 10. The first ablation station 50 can comprise a laser 54 and sensor 56 as depicted in FIG. 2. The use of lasers for ablating through flexible materials is generally known, for example as described in U.S. Pat. No. 5,158,499, incorporated herein by reference. The depth of the ablation formed by the laser can be regulated by regulating the power output or beam intensity of the laser beam, the width or spot size of the laser beam, and the amount of time a given spot on the film surface is irradiated by the beam. These factors generally are selected based on the characteristics of the material being ablated. Some materials are more readily ablated by lasers than other materials, as known in the art. Sensor 56 can detect a feature, such as an eye mark, on the laminate 46 whose location is known, so that the ablation by laser 54 is in registration with the parameters of the package design based on signals from the detector, as would be understood by one of ordinary skill in the art.

Next, the laminate is advanced to an optional second ablation station 60 that can comprise a laser 64 and sensor 66. The operation of the laser 64 is synchronized with the advancement of the laminate in a manner as described above.

As an alternative to the use of lasers for ablation of the laminate, ablation of the laminate 46 may be accomplished by cutting or chemical removal. For instance, as depicted in FIG. 3, a first ablation station 50' can comprise a kiss roll 51 and backing roll 53 that form a nip through which the laminate is passed. The kiss roll 51 comprises a rotary cutting die defining a cutting edge (not shown). The kiss roll acts in conjunction with the backing roll to cut partially through the thickness of the laminate starting from the outer surface of the first structure 10, such that the first structure 10 is substantially ablated through while the second structure 42 is left intact. The second ablation station 60' likewise comprises a kiss roll 61 and backing roll 63 for ablating through the second structure 42.

Additionally, it is within the scope of the invention to ablate one side of the laminate via laser and to cut or otherwise mechanically or chemically ablate the other side. This can be advantageous, for example, when one of the structures making up the laminate is readily ablated by a laser but the other structure is not. For instance, when the first structure 10 is a polyester such as PET, it can readily be ablated with a laser, but if a polyethylene heat seal layer is employed on the opposite side, laser ablation may not be the best choice because polyethylene does not ablate well with a laser. In this case, kiss cutting or other mechanical process can be used to ablate the inner structure 42.

After the ablation operations, the laminate 46 can be sent to a reel-up (not shown) and wound into a roll for subsequent processing. The laminate can also be slit into a plurality of partial widths and wound into multiple rolls. In this latter instance, each partial width would have the recurring patterns of adhesives applied with suitably configured adhesive applicators to the full-width material, and would have the recurring ablated areas formed by suitably configured ablation devices acting on either the full-width laminate prior to slitting or acting on each partial-width portion after slitting.

Some possible applications for the resulting laminate are now explained with reference to FIGS. 4-6. FIGS. 4-6 show a flexible package 94 and the associated laminate portion 70. The flexible package 94 includes a laminate portion 70 cut from the laminate 46 that is manipulated to form a package to hold one or more of an assortment of contents and is sealed to enclose the contents.

As illustrated in FIG. 4, a flexible package 94 is formed from a laminate portion 70 cut from laminate 46 using various methods known in the art. Laminate portion 70 includes a number of sections that make up different parts of a fully formed flexible package 94. The laminate 70 includes a top end 74 with a top seal area 76 represented by a hatched region. Top portion 74 also includes first tear area 78 and second tear area 79 and one or more sealant reduction areas 80. The laminate portion 70 also includes a bottom end 72 with a bottom seal area 76 represented by a hatched region.

FIG. 4 also illustrates parts of the laminate portion 70 that make up the different panels or portions of a finished flexible package 94. The panels spanning the entire height of the laminate portion 70 include the front panel 82, first-visible rear panel 84, visible fin panel 86, second-visible rear panel 88, covered rear panel 90, and interior fin panel 92. Each of the panels of the laminate portion 70 abut one or more other panels at junctions 93 illustrated by dashed lines. In particular, visible fin panel 86 forms a junction 93 with a side of the first-visible rear panel 84, and the front panel 82 forms another junction 93 with the first-visible rear panel 84. The second-visible rear panel 88 forms a junction 93 with the front panel 82, the same junction 93 also separating the first tear area 78 from the second tear area 79. Another junction 93 is located between the second-visible rear panel 88 and the covered rear panel 90. Finally, a junction exists between the covered rear panel 90 and the interior fin panel 92.

The tear areas 78, 79 of the laminate are preferably positioned along the junction 93 between the front panel 82 and the second-visible rear panel 88 in an abutting relationship.

The shape of the tear areas 78, 79 may be substantially semicircular or parabolic segments with respect to the junction 93. Together, tear areas 78, 79, when abutting each other, may form a substantially circular area on the laminate portion 70. A center area formed between the combination of the abutting tear areas 78, 79 may be offset in a perpendicular direction from the junction 93 existing between tear areas 78, 79.

The sealant reduction areas 80 are positioned in the top seal portion 76 of the laminate portion 70. In a preferred embodiment, sealant reduction areas 80 are located in the top seal portion 76 of the front panel 82, the first-visible rear panel 84, and the interior fin panel 92. The sealant reduction areas 80 of the preferred embodiment are also positioned adjacent to one or both of tear areas 78, 79. The sealant reduction areas 80 are also preferably positioned along a path that the laminate portion will be torn by a user of the flexible package 94.

Formation of the first tear area 78, second tear area 79, and sealant reduction areas 80 may be accomplished through the use of a laser ablation process discussed above. By performing laser ablation on a surface of the laminate portion 70, a laser can be configured to penetrate through either a portion or the full thickness of the laminate portion 70. Ablation of a tear area of the laminate portion 70 preferably begins at a center of the area to be ablated and progressively moves the laser in a direction radially outwardly from the center of the tear area. The use of such a technique helps in reducing the amount of scrap material from the laminate portion 70 that may be produced during the ablation process. Ablation of the laminate portion 70 may also include the formation of a score line adjacent to the tear areas 78, 79. Such a score line is preferably oriented in a tearing direction and adjacent the tear areas 76, 78.

FIG. 5 illustrates a fully assembled flexible package 94 constructed from the laminate portion 70 described above. The edges or creases of the flexible package are formed along the respective junctions 93 to form the different panels and fin of the flexible package 94. The flexible package 94 is manipulated into a tubular shape, and bottom end 72 and the top end 74 of the laminate portion 70 are sealed together along seal areas 76. After the flexible package 94 has been sealed, tear areas 76, 78 are exposed along the junction between the front panel 92 and second-visible rear panel 88 to form a groove to assist in beginning the opening process of the flexible package 94.

When the flexible package 94 is opened, a tear is created in the flexible package 94 at the groove formed by the tear areas 76, 78 as illustrated in FIG. 6. After a tear is created in the flexible package 94, the tear is propagated in a transverse direction such that the tear passes through the sealant reduction areas 80 to facilitate opening the flexible package 94. By opening flexible package 94 at the tear areas 76, 78 and through the sealant reduction areas 80, the laminate portion is more readily torn and less susceptible to stretching. Thus, the occurrence of opening failures in the flexible package 94 can be reduced.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making a flexible packaging structure having a built-in opening feature, comprising the steps of:
   (a) providing a laminate having a first structure comprising one or more layers of flexible material laminated to a second structure comprising at least a sealant layer;
   (b) forming a substantially circular tear area in a top seal area of the laminate, the tear area being formed by using a laser beam to penetrate through at least a portion of a thickness of the laminate material, wherein the laser beam initially starts acting on the laminate at a center of the tear area, and the laser beam is progressively moved along a path extending around and radially outwardly from the center and finishes by defining an outer perimeter of the tear area; and
   (c) forming the laminate resulting from step (b) into a package by manipulating the laminate into a tube and joining together opposite longitudinal edge portions of the laminate, closing a top end of the tube by sealing the laminate in the top seal area, and closing a bottom end of the tube by sealing the laminate in a bottom seal area;
   wherein step (c) results in there being a front panel and a rear panel of the package, with a first juncture between the front and rear panels forming a first longitudinal edge of the package and a second juncture between the front and rear panels forming an opposite second longitudinal edge of the package, and with the tear area forming a tear feature at the first longitudinal edge of the package where tearing of the laminate can be initiated to open the package.

2. The method of claim 1, wherein the laser beam in step (b) penetrates completely through the thickness of the laminate such that the tear area forms a hole through the laminate.

3. The method of claim 1, further comprising a step (b') performed prior to step (c), wherein step (b') comprises using a laser beam to ablate a region of the sealant layer in the top seal area so as to form a sealant reduction area, the sealant reduction area being positioned along a path along which the laminate will be torn during opening of the package.

4. The method of claim 3, wherein step (c) includes forming a longitudinal fin seal by sealing together an inside fin panel and an outside/visible fin panel, and wherein step (b') includes using the laser beam to ablate the sealant layer on a portion of the inside fin panel, said portion of the inside fin panel being located along said path along which the laminate will be torn during opening of the package.

5. The method of claim 4, further comprising a step (b") performed prior to step (c), wherein step (b") comprises forming a score line in the laminate adjacent to the tear area.

6. The method of claim 5, wherein the score line is formed using a laser beam.

\* \* \* \* \*